US008852483B2

(12) United States Patent
Trost et al.

(10) Patent No.: US 8,852,483 B2
(45) Date of Patent: Oct. 7, 2014

(54) METHOD AND APPARATUS FOR PRODUCING FIGURED VENEER

(75) Inventors: Juergen F. Trost, Reutlingen (DE); Glenn Leslie Wagoner, Darlington, PA (US)

(73) Assignee: Padana AG, Baar (CH)

( * ) Notice: Subject to any disclaimer, the term of this patent is extended or adjusted under 35 U.S.C. 154(b) by 0 days.

(21) Appl. No.: 13/547,471

(22) Filed: Jul. 12, 2012

(65) Prior Publication Data

US 2013/0001827 A1 Jan. 3, 2013

Related U.S. Application Data

(63) Continuation of application No. 12/741,538, filed as application No. PCT/US2008/082955 on Nov. 10, 2008, now Pat. No. 8,562,328.

(60) Provisional application No. 60/988,846, filed on Nov. 19, 2007.

(30) Foreign Application Priority Data

Nov. 10, 2008 (WO) .................. PCT/US2008/08295

(51) Int. Cl.

| | |
|---|---|
| ***B29C 59/04*** | (2006.01) |
| ***B27M 1/02*** | (2006.01) |
| ***B27L 5/00*** | (2006.01) |
| ***B27D 5/00*** | (2006.01) |

(52) U.S. Cl.

CPC .. *B27D 5/00* (2013.01); *B27M 1/02* (2013.01); *B27L 5/00* (2013.01)

USPC ............................ 264/293; 264/320; 264/322

(58) Field of Classification Search

USPC ........................................ 264/293, 320, 322

See application file for complete search history.

(56) References Cited

U.S. PATENT DOCUMENTS

| | | | |
|---|---|---|---|
| 14,472 | A | 3/1856 | Schwickardt |
| 55,604 | A | 6/1866 | Beckers |
| 1,971,780 | A | 8/1934 | Graham et al. |
| 2,017,037 | A | 10/1935 | Brown |
| 2,610,135 | A | 9/1952 | Moore |
| 2,717,423 | A | 9/1955 | Uhlig et al. |

(Continued)

FOREIGN PATENT DOCUMENTS

| | | |
|---|---|---|
| CA | 2 100 131 A1 | 1/1995 |
| DE | 24 02 969 A1 | 7/1975 |

(Continued)

OTHER PUBLICATIONS

"Inside-Out Carving", Popular Science, May 1961, pp. 170-171.

(Continued)

*Primary Examiner* — James Sanders

(74) *Attorney, Agent, or Firm* — Barnes & Thornburg LLP

(57) ABSTRACT

A method for making a piece of figured veneer comprises softening lignin in a sheet of veneer, and advancing the sheet of veneer between a first roller having a semi-flexible outer surface and a second roller. Apparatus for making a piece of figured veneer comprises a device for softening lignin in a sheet of veneer, and first and second rollers between which the sheet of veneer is pressed. The first roller has a semi-flexible outer surface.

11 Claims, 8 Drawing Sheets

(56) References Cited

U.S. PATENT DOCUMENTS

| | | | |
|---|---|---|---|
| 2,759,506 A | 8/1956 | Lee | |
| 3,586,591 A | 6/1971 | Munters et al. | |
| 4,388,133 A | 6/1983 | Hirao et al. | |
| 4,554,959 A | 11/1985 | Smedberg | |
| 4,865,912 A | 9/1989 | Mitsumata | |
| 5,141,038 A * | 8/1992 | Nakaya | 144/213 |
| 6,139,965 A | 10/2000 | Murai | |
| 6,298,888 B1 | 10/2001 | Murai | |
| 6,481,476 B1 | 11/2002 | Okamoto | |
| 7,108,031 B1 | 9/2006 | Secrest | |

FOREIGN PATENT DOCUMENTS

| | | |
|---|---|---|
| GB | 1230817 A | 5/1971 |
| JP | 64-55202 | 3/1989 |
| JP | 08-332603 | 12/1996 |

OTHER PUBLICATIONS

International search report and written opinion for PCT/US20081082955 completed May 22, 2009.

International preliminary report on patentability for PCT/US2008/082955 issued May 25, 2010.

Official action from parent U.S.S.N. 12/741,538, dated Jul. 24, 2012, 7 pages.

Supplementary European Search Report from EP 08851739.6-1709 dated Jan. 16, 2014, 10 pages.

* cited by examiner

METHOD AND APPARATUS FOR PRODUCING FIGURED VENEER

CROSS REFERENCE TO RELATED APPLICATIONS

This application claims the benefit under 35 U.S.C. §120 of U.S. Ser. No. 12/741,538 filed May 5, 2010. U.S. Ser. No. 12/741,538 is the U.S. national phase of PCT/US2008/82955 filed Nov. 10, 2008. PCT/US2008/82955 claims the benefit under 35 U.S.C. §119(e) of the Nov. 19, 2007 filing date of U.S. Ser. No. 60/988,846. The complete disclosures of U.S. Ser. No. 12/741,538, PCT/US2008/82955 and U.S. Ser. No. 60/988,846 are hereby incorporated herein by reference.

FIELD OF THE INVENTION

This invention relates to methods and apparatus for producing wood products. It is disclosed in the context of methods and apparatus for producing figured wood veneers, but is believed to have other applications as well.

BACKGROUND OF THE INVENTION

Method and apparatus for producing figured wood veneer and other figured wood products are known. There are, for example, the methods and apparatus illustrated and described in U.S. Pat. Nos.: 7,108,031; 6,481,476; 6,298,888; 6,139,965; and, 4,865,912. The disclosures of all of these references are hereby incorporated herein by reference. This listing is not intended to be a representation that a complete search of all relevant art has been made, or that no more pertinent art than that listed exists, or that the listed art is material to patentability. Nor should any such representation be inferred.

DISCLOSURE OF THE INVENTION

A method for making a piece of figured veneer comprises softening lignin in a sheet of veneer, advancing the sheet of veneer between a first roller having a semi-flexible outer surface and a second roller having a corrugated outer surface to form a sheet of corrugated veneer having a plurality of crests, and surfacing the sheet of corrugated veneer to remove the plurality of crests to make the piece of figured veneer.

Illustratively, advancing the sheet of veneer between a first roller having a semi-flexible outer surface and a second roller having a corrugated outer surface comprises advancing the sheet of veneer between a first roller having a corrugated semi-flexible outer surface and a second roller having a corrugated outer surface.

Illustratively, advancing the sheet of veneer between the first roller having the semi-flexible outer surface and the second roller having the corrugated outer surface comprises engaging a first plurality of corrugations of the first roller and a second plurality of corrugations of the second roller with the sheet of veneer.

Illustratively, advancing the sheet of veneer between a first roller having a semi-flexible outer surface and a second roller having a corrugated outer surface comprises advancing the sheet of veneer between a first roller having a vulcanized elastomeric material outer surface and a second roller having a corrugated outer surface.

Illustratively, softening the lignin in the sheet of veneer comprises heating the sheet of veneer.

Illustratively, heating the sheet of veneer comprises steaming the sheet of veneer in a steamer.

Further illustratively, the method comprises drying the sheet of corrugated veneer without relieving the corrugations.

Illustratively, drying the sheet of corrugated veneer comprises passing the sheet of corrugated veneer through a veneer drying oven.

Illustratively, surfacing the sheet of corrugated veneer comprises sanding the sheet of veneer.

Apparatus for making a piece of figured veneer comprises a device for softening lignin in a sheet of veneer, and first and second rollers between which the sheet of veneer is pressed. The first roller has a semi-flexible outer surface. The second roller has a corrugated outer surface to form a sheet of corrugated veneer having a plurality of crests. The apparatus further comprises a device for surfacing the sheet of corrugated veneer to remove the plurality of crests to make the piece of figured veneer.

Illustratively, the semi-flexible outer surface comprises a vulcanized elastomeric material.

Illustratively, the device for softening lignin in a sheet of veneer comprises a steamer.

Further illustratively, the apparatus comprises a veneer drying oven for drying the piece of figured veneer.

Illustratively, the second roller comprises a steel roller.

Apparatus for making a piece of figured veneer comprises a device for softening lignin in a sheet of veneer, and complementary corrugating press rollers for pressing the sheet of veneer. Each complementary corrugating press roller has a pitch and a depth to press the sheet of veneer into a sheet of corrugated veneer having a plurality of crests. The complementary corrugating press rollers include a first roller having a semi-flexible surface.

Further illustratively, the apparatus comprises a device for surfacing the sheet of corrugated veneer to remove the plurality of crests to make the piece of figured veneer.

Illustratively, the device for surfacing the sheet of corrugated veneer comprises a sanding device.

Illustratively, the semi-flexible surface comprises a vulcanized elastomeric material.

Illustratively, the device for softening lignin in a sheet of veneer comprises a steamer.

Further illustratively, the apparatus comprises a veneer drying oven for drying the sheet of corrugated veneer without relieving the corrugations.

BRIEF DESCRIPTIONS OF THE DRAWINGS

The invention may best be understood by referring to the following detailed description and accompanying drawings which illustrate the invention. In the drawings.

Figure 1:
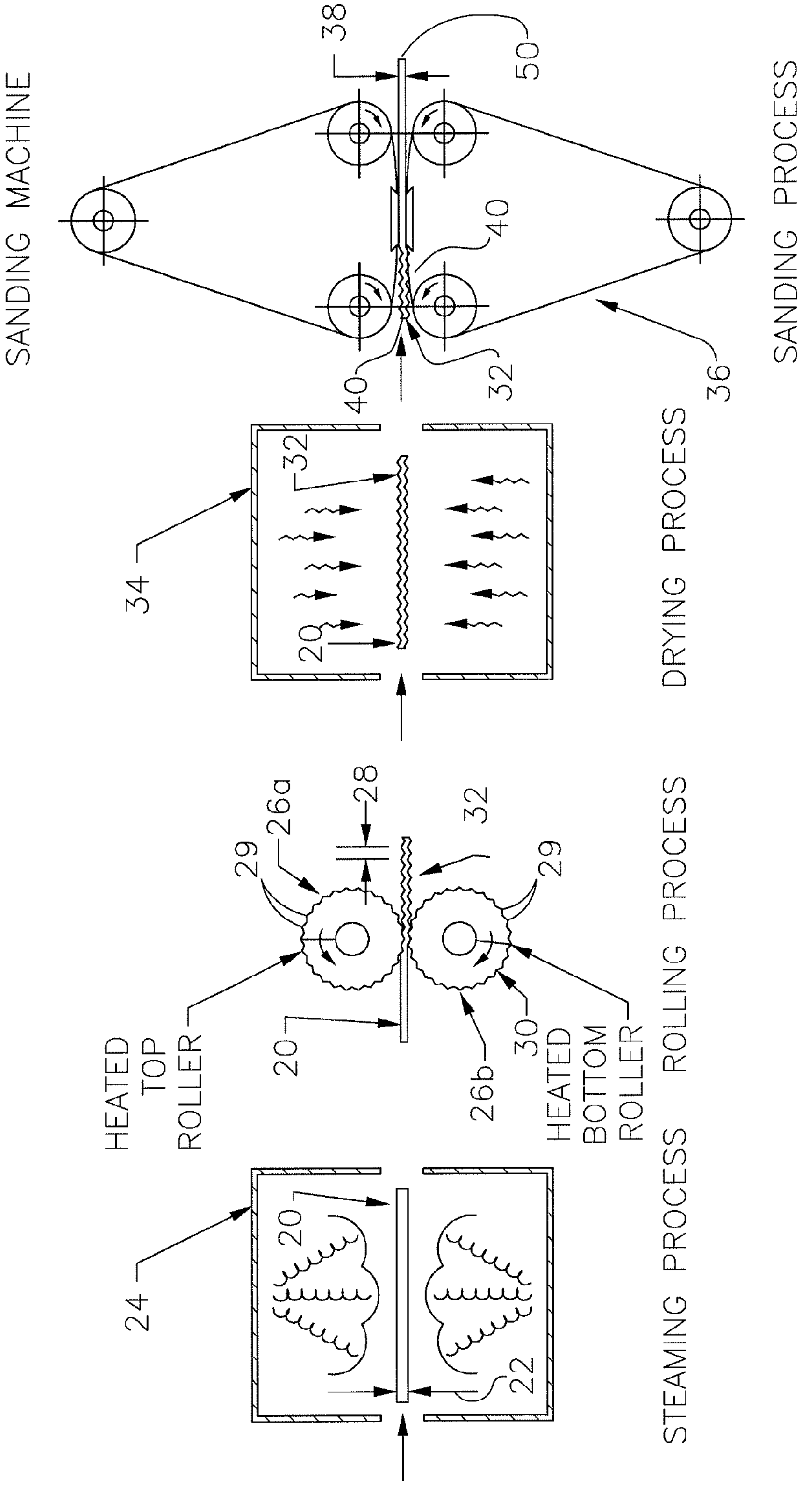
FIG. 1 illustrates a method and apparatus for making figured veneer.
Figure 2:
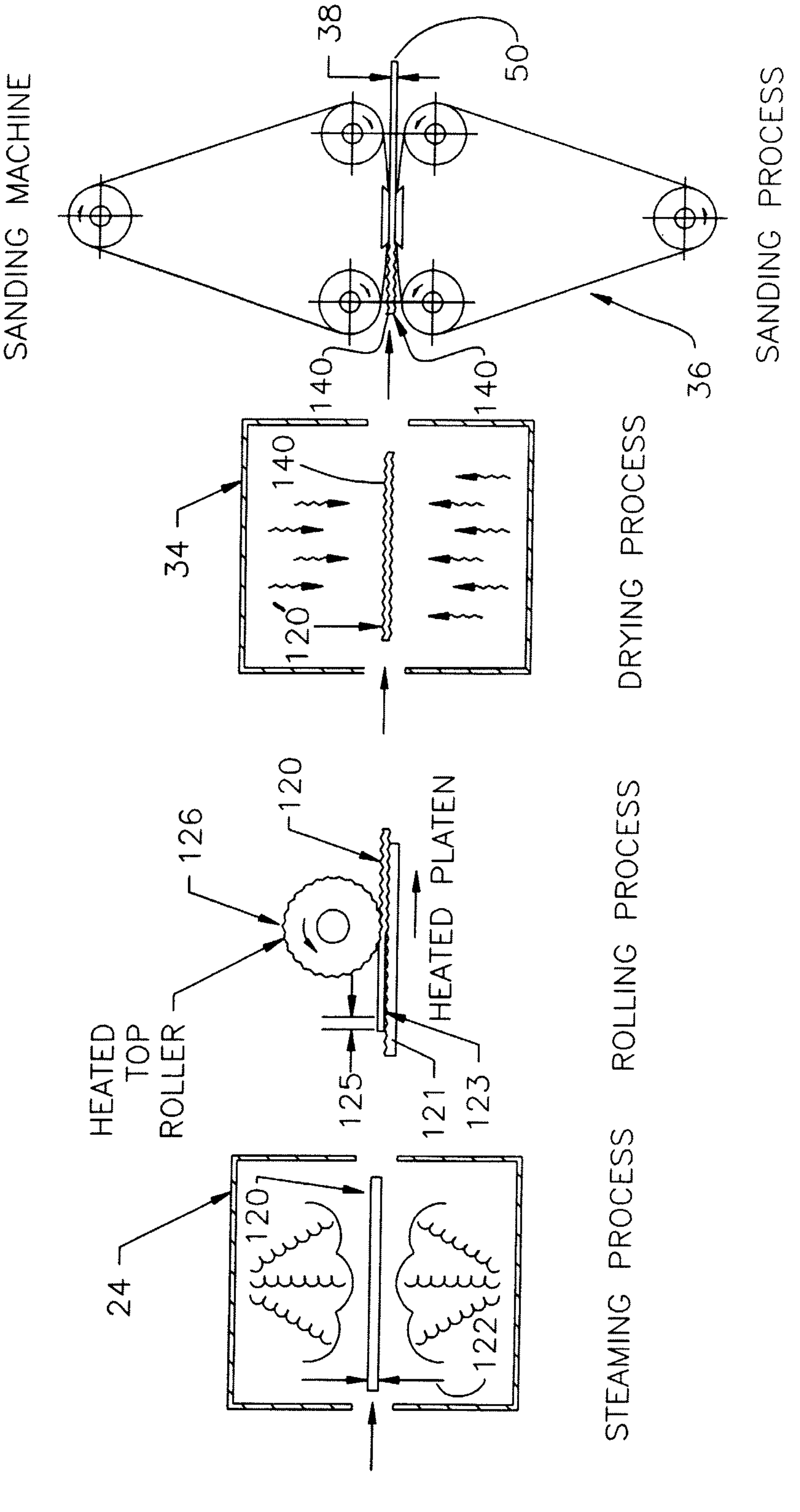
FIG. 2 illustrates another method and apparatus for making figured veneer.
Figure 3A:
Figure 3B:
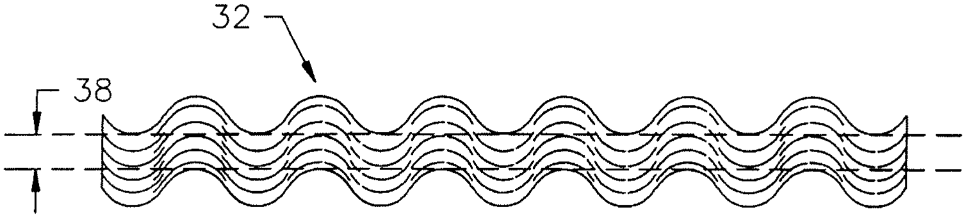
Figure 3C:
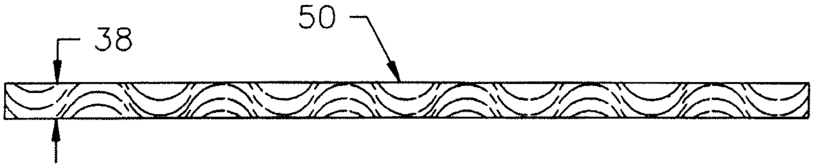
Figure 3D:
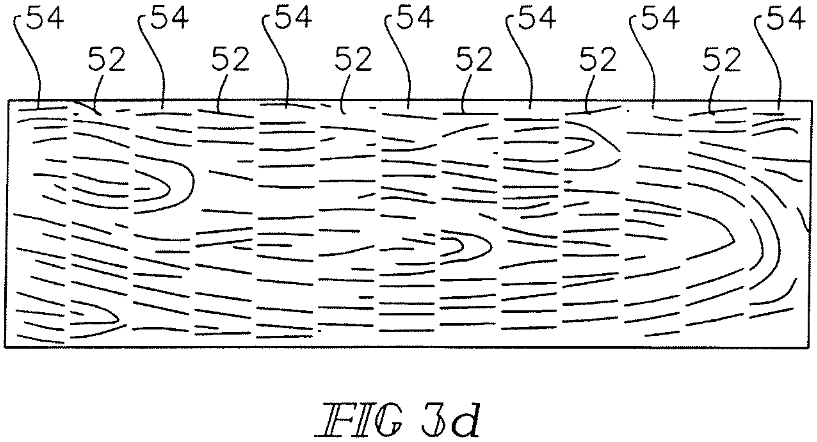
Figure 4:
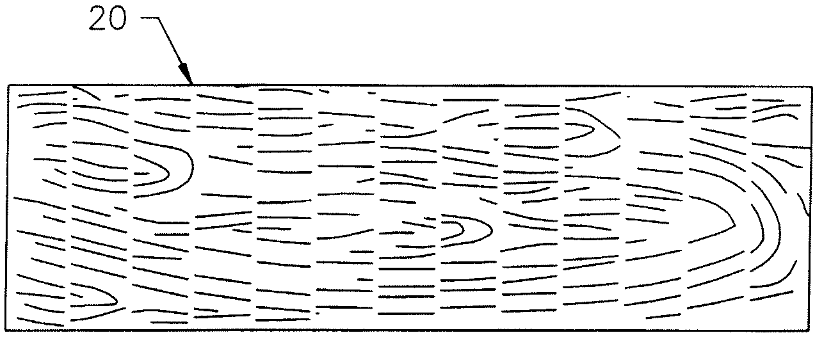
Figure 5:
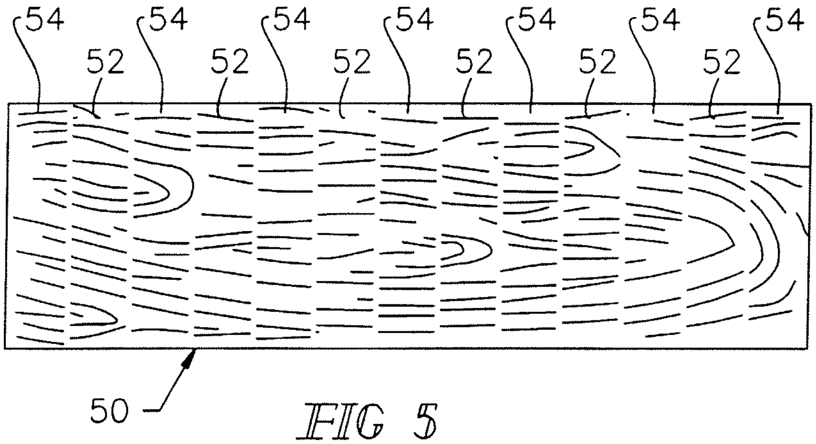
Figure 6:
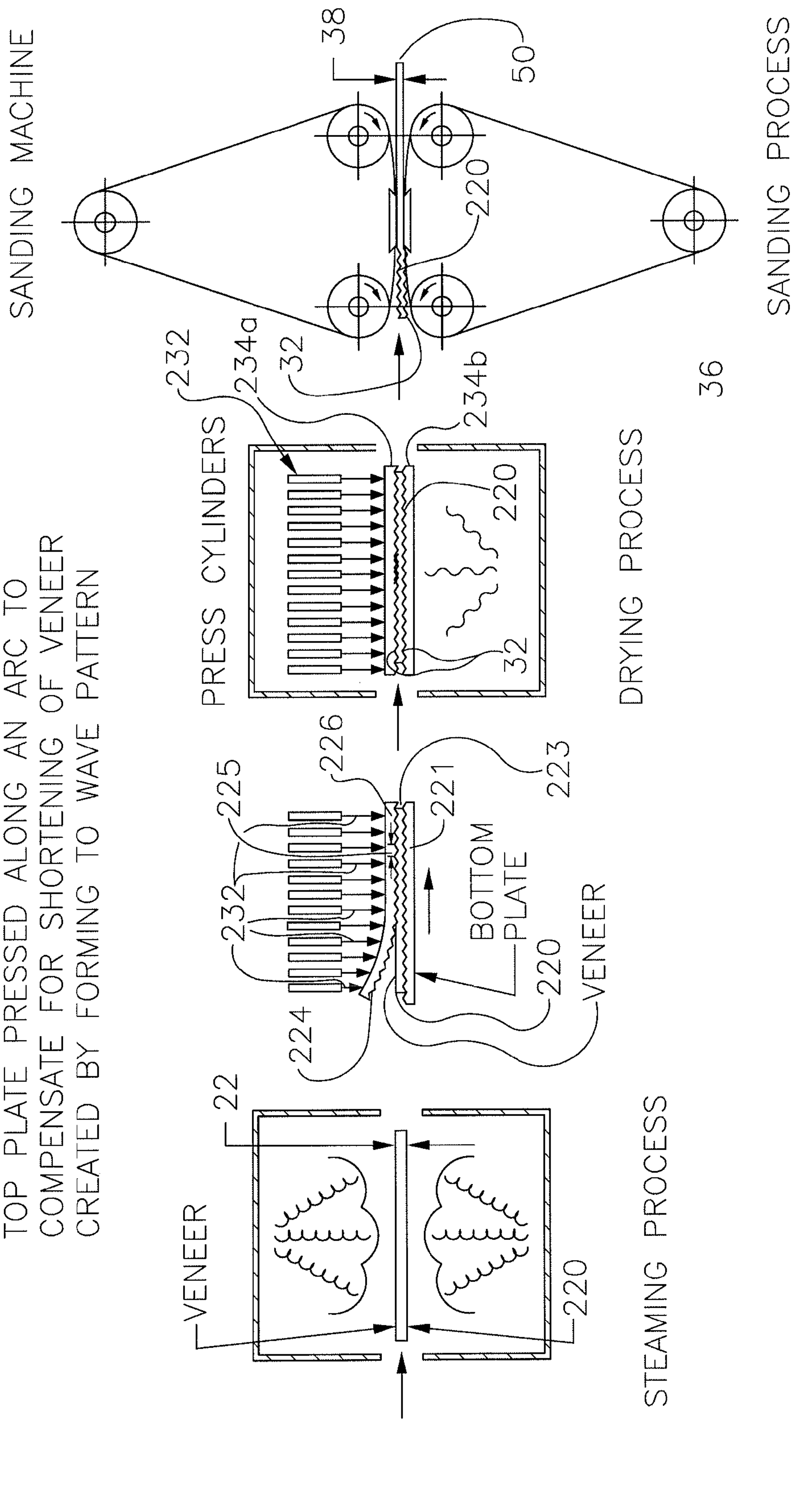
Figure 7:
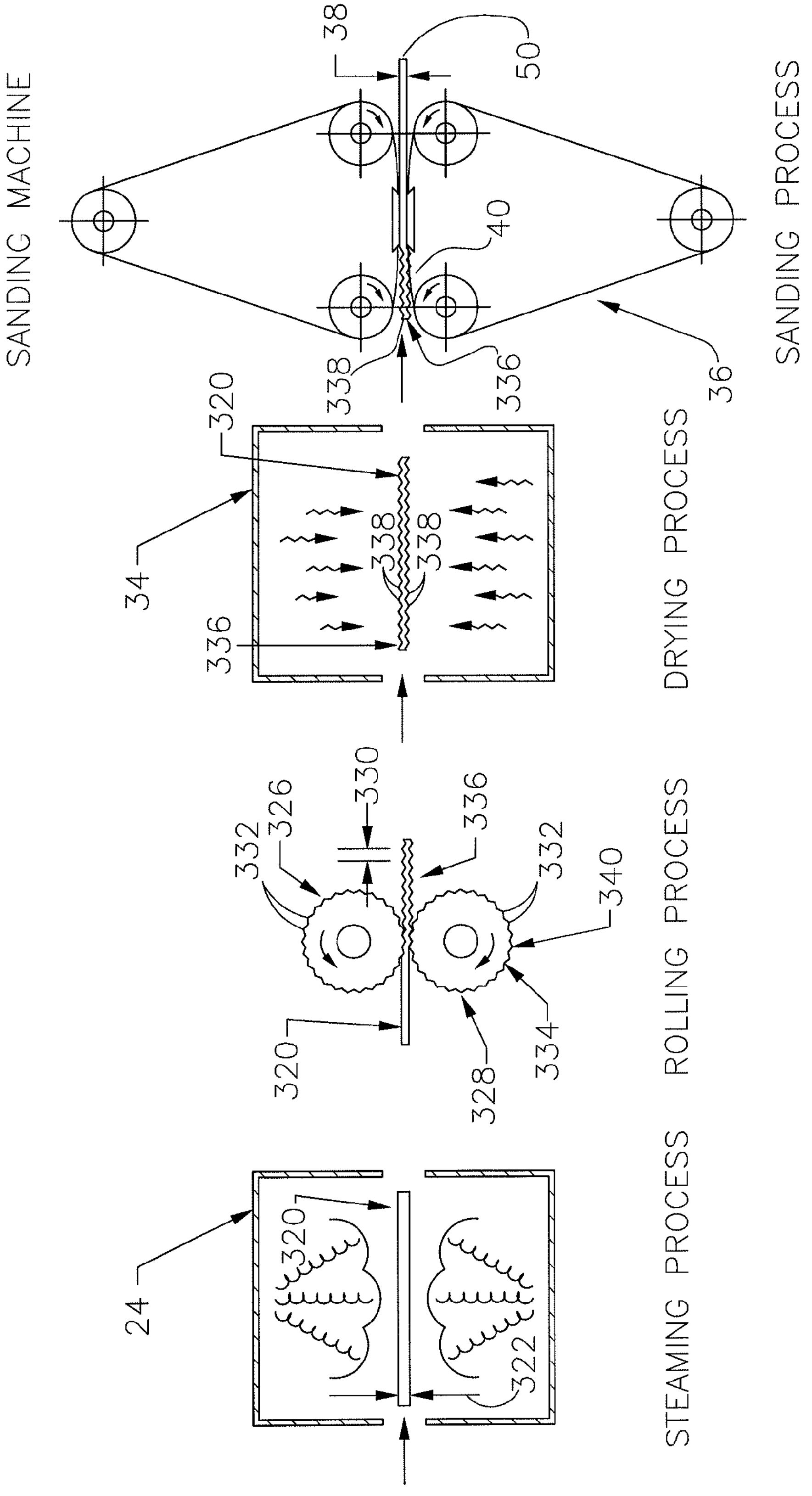
Figure 7A:
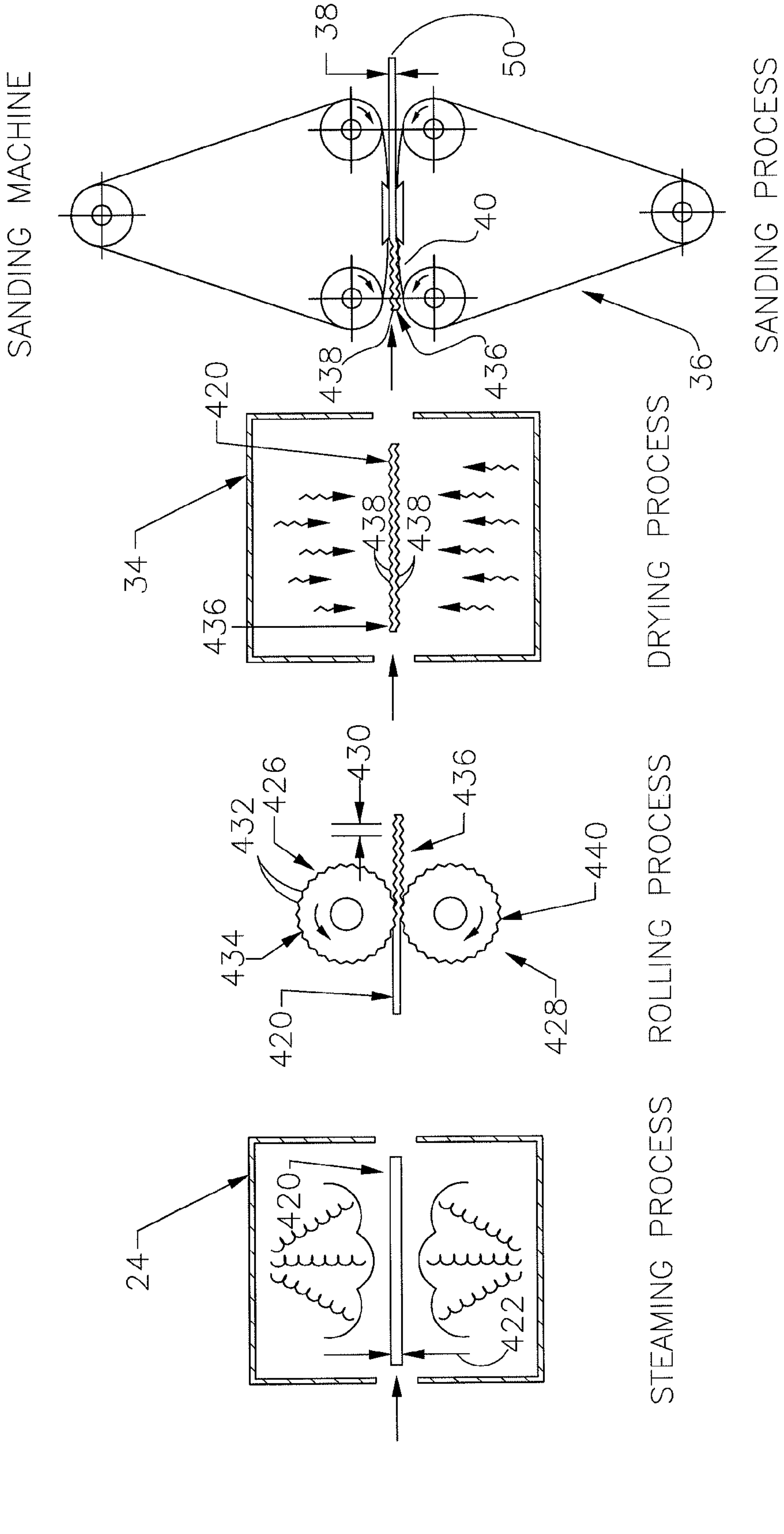
Figure 8:
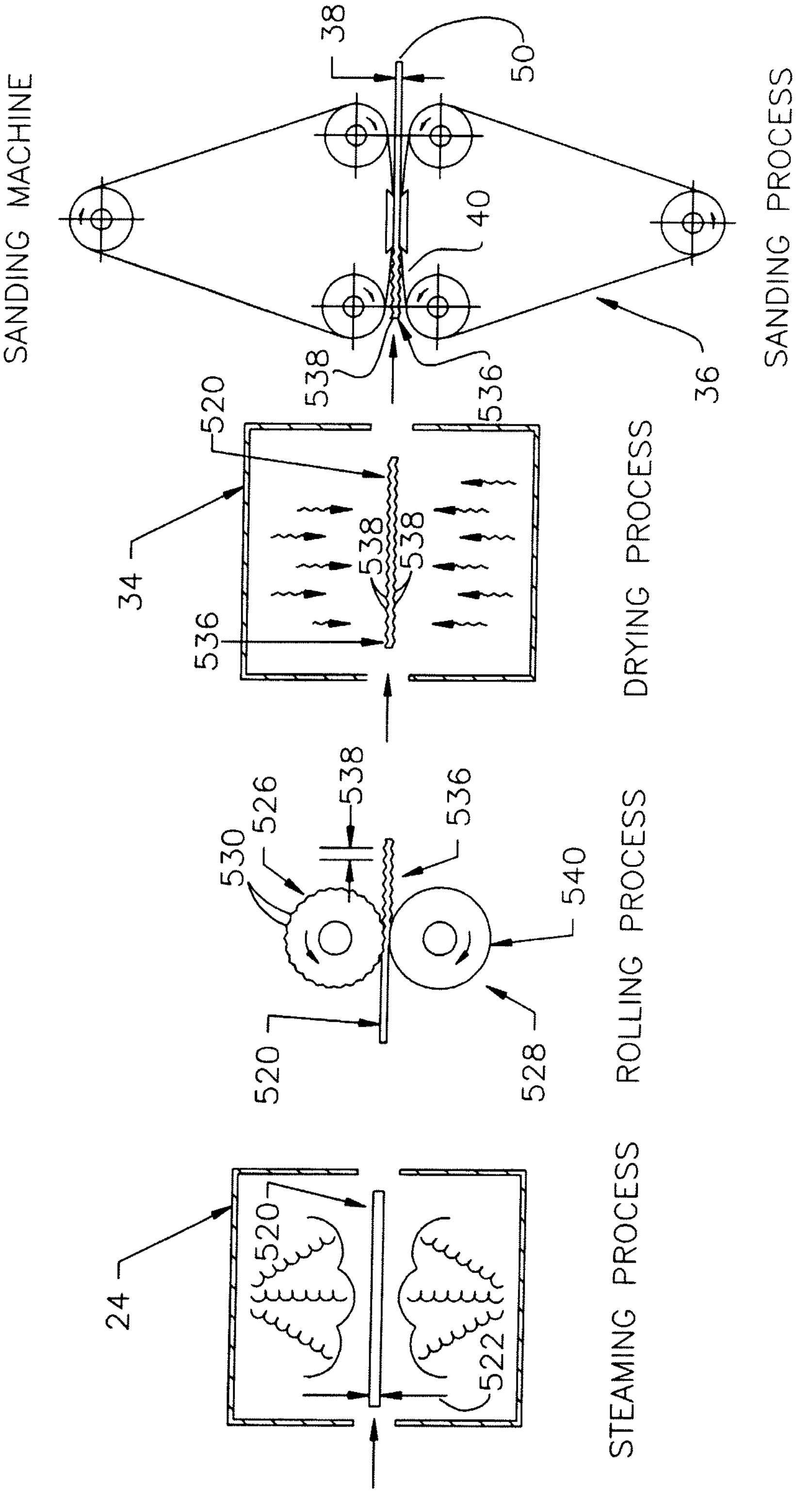

FIG. 3*a* illustrates a side view of a sheet of veneer which has been partially processed through the rolling process of FIG. 1;

FIG. 3*b* illustrates the sheet of veneer of FIG. 3*a* with processing lines superimposed on the sheet illustrating the material to be removed in the sanding process of FIG. 1 or FIG. 2;

FIG. 3*c* illustrates a side view of the sheet of veneer illustrated in FIGS. 3*a* and 3*b* after the sheet has been processed through the sanding process of FIG. 1 or FIG. 2;

FIG. 3*d* illustrates a plan view of the sheet illustrated in FIG. 3*c*;

FIG. 4 illustrates a plan view of an unprocessed sheet of veneer;

FIG. 5 illustrates a plan view of the sheet illustrated in FIG. 4 after processing through the processes of FIG. 1 or FIG. 2;

FIG. 6 illustrates another method and apparatus for making figured veneer;

FIG. 7 illustrates another method and apparatus for making figured veneer;

FIG. 7*a* illustrates another method and apparatus for making figured veneer; and FIG. 8 illustrates another method and apparatus for making figured veneer.

DETAILED DESCRIPTIONS OF ILLUSTRATIVE EMBODIMENTS

A process for producing a piece of figured veneer 50 illustrated in FIGS. 3*d* and 5 comprises softening lignin in a sheet 20 of veneer illustrated in FIG. 4, then pressing the sheet 20 of veneer between complementary members each having a pitch and a depth to press the sheet of veneer into a wavy or corrugated configuration illustrated in FIGS. 1, 2, 3*a* and 3*b*, and surfacing the wavy sheet of veneer to remove crests of the corrugations to form a sheet of uniform thickness 38 as illustrated in FIG. 3*c*, producing the piece of figured veneer 50 illustrated in FIG. 5.

Referring now to FIG. 1, one illustrated process proceeds as follows. Veneer 20 having a thickness 22 in the range of about 1.2 to about 1.5 mm is heated, for example, by steaming it in a batch process or continuous process steamer 24, to soften the lignin in the veneer 20. The thus-heated veneer 20 is then pressed between two complementary corrugating press rollers 26*a*, 26*b* having any desired pitch 28 (illustratively about 5 cm to about 10 cm), depending, among other things, on the size of the article to be constructed using the veneer 20, between crests 29 of the rollers and a depth 30 in the range of about 0.25 to about 0.75 mm to press the sheets of veneer 20 into a wavy or corrugated configuration 32. The veneer 20 is then dried, for example, in a veneer drying oven 34, without relieving the corrugations. Then, the dried veneer 20 is surfaced, for example, sanded using a sander 36, to a veneer thickness 38 in the range of about 0.25 to about 0.75 mm. Through this surfacing process crests 40 of the corrugations are removed, cutting through the grain. The overall appearance of the thus-processed figured veneer 50 changes. The reflection of light change between adjacent interleaved areas 52, 54 in the figured veneer 50 creates the figured effect illustrated in FIG. 5.

Another process for producing a piece of figured veneer 50 comprises softening lignin in a sheet 20 of veneer, placing the sheet 20 of veneer onto a wavy or corrugated surface of a plate having such a wavy or corrugated surface, pressing the sheet 20 of veneer onto the troughs and peaks of the surface using a press roller so that the roller presses the sheet of veneer against the surface to achieve a wavy or corrugated configuration as illustrated in FIGS. 3*a* and 3*b*, and surfacing the pressed sheet of veneer to remove peaks of the corrugations as illustrated in FIG. 3*c*, producing the piece of figured veneer 50 illustrated in FIGS. 3*d* and 5.

Referring now to FIG. 2, this process proceeds as follows. Veneer 120 having a thickness 122 in the range of about 1.2 to about 1.5 mm is heated to soften the lignin in the veneer 120. The thus-heated veneer 120 is then laid on a plate 121 having a wavy or corrugated surface 123. A press roller 126 having substantially the same pitch 125 as the corrugations of surface 123 is then run along the troughs and peaks of the corrugations of surface 123 so that the roller 126 presses the softened veneer 120 against the plate 121 to achieve a wavy or corrugated veneer 120' as in the first embodiment of the process. The veneer 120' is then dried without relieving the corrugations and surfaced to a veneer thickness 38 of in the range of about 0.25 to about 0.75 mm. Through this surfacing process, crests 140 of the corrugations are removed, cutting through the grain. The overall appearance of the thus-processed figured veneer 50 and its reflection of light change as described above.

In yet another embodiment of the process illustrated in FIG. 6, a sheet of veneer 220 having a thickness 222 with softened lignin is laid on a plate 221 having a wavy or corrugated surface 223. A flexible platen 226 having a wavy or corrugated surface 224 having substantially the same pitch 225 as the corrugations of surface 223 is then engaged with the sheet of veneer 220. A load 232 (illustratively provided by individually controlled pneumatic or hydraulic cylinders) is applied along the flexible platen such that the troughs and peaks of the corrugations of surface 224 press the softened veneer 220 against the plate 221 to achieve a wavy or corrugated configuration 32 of veneer 220 as in the preceding embodiments. The flexible platen 226 presses veneer 220 into corrugated surface 223 as the pressing force 232 advances from one end to the other to prevent stresses along the grain of veneer 220 as its length is shortened as the corrugations are formed. The veneer 220 is then held in pressed shape, illustratively between two plates 234*a* and 234*b*, and allowed to dry without relieving the corrugations and surfaced (again, for example, by sanding) to a veneer 50, FIGS. 3*c*, 3*d* and 5, having a thickness 38 of in the range of about 0.25 to about 0.75 mm. The overall appearance of the thus-processed figured veneer 50 and its reflection of light change as described above.

In yet another embodiment of the process illustrated in FIG. 7, veneer 320 having a thickness 322 in the range of about 1.2 to about 1.5 mm is heated, for example, by steaming it in a batch process or continuous process steamer 24, to soften the lignin in the veneer 320. The thus-heated veneer 320 is then pressed between two complementary corrugating press rollers 326, 328 having any desired pitch 330 (illustratively about 5 cm to about 10 cm), depending, among other things, on the size of the article to be constructed using the veneer 320, between crests 332 of the rollers and a depth 334 in the range of about 0.25 to about 0.75 mm to press the sheets of veneer 320 into a wavy or corrugated sheet 336 having a plurality of crests 338. In the illustrative embodiment, the press roller 328 has a resilient, somewhat flexible outer surface 340, such as one formed from a vulcanized elastomeric material. One example of a vulcanized elastomeric material is 75 durometer urethane.

The corrugated sheet 336 is then dried, for example, in a veneer drying oven 34, without relieving the corrugations. Then, the dried corrugated sheet 336 is surfaced, for example, sanded using a sander 36, to a veneer thickness 38 in the range of about 0.25 to about 0.75 mm. Through this surfacing process crests 338 of the corrugations of the corrugated sheet 336 are removed, cutting through the grain. The overall appearance of the thus-processed figured veneer 50 changes. The reflection of light change between adjacent interleaved areas 52, 54 in the figured veneer 50 creates the figured effect illustrated in FIG. 5.

In yet another embodiment of the process illustrated in FIG. 7*a*, veneer 420 having a thickness 422 in the range of about 1.2 to about 1.5 mm is heated, for example, by steaming it in a batch process or continuous process steamer 24, to soften the lignin in the veneer 420. The thus-heated veneer 420 is then pressed between two press rollers 426, 428. The press roller 426 is corrugated and has any desired pitch 430 (illustratively about 5 cm to about 10 cm), depending, among other things, on the size of the article to be constructed using the veneer 420, between crests 432 of the rollers and a depth 434 in the range of about 0.25 to about 0.75 mm to press the sheets of veneer 420 into a wavy or corrugated sheet 436 having a plurality of crests 438.

The press roller 428 has a resilient, somewhat flexible outer surface 440, such as one formed from a vulcanized elastomeric material. One example of a vulcanized elastomeric material is 75 durometer urethane. The press roller 428 can be complementarily corrugated to the press roller 426, or can be smooth. In the embodiment illustrated in FIG. 7*a*, the outer surface 440 of the press roller 428 is substantially smooth, not corrugated.

The corrugated sheet 436 is then dried, for example, in a veneer drying oven 34, without relieving the corrugations. Then, the dried corrugated sheet 436 is surfaced, for example, sanded using a sander 36, to a veneer thickness 38 in the range of about 0.25 to about 0.75 mm. Through this surfacing process, crests 438 of the corrugations of the corrugated sheet 436 are removed, cutting through the grain. The overall appearance of the thus-processed figured veneer 50 changes. The reflection of light change between adjacent interleaved areas 52, 54 in the figured veneer 50 creates the figured effect illustrated in FIG. 5.

In yet another embodiment of the process illustrated in FIG. 8, veneer 520 having a thickness 522 in the range of about 1 to about 1.5 mm is heated, for example, by steaming it in a batch process or continuous process steamer 24, to soften the lignin in the veneer 520. The thus-heated veneer 520 is then pressed between two press rollers 526, 528. The press roller 526 has an outer surface 530 with the corrugated pattern etched into or onto it. The illustrated roller 526 is made from AISI C1026, a chromium-free standard steel. The etching process to create the desired corrugated pattern may generally be as follows. A digital image of the pattern is taken. This image is transferred to a polymer material. The image may need to be extended in width, as the image typically is not as wide as the roller 526. The polymer material sheet containing the image is wrapped on the roller 526 and a suitable etchant is applied. As the etching proceeds in a controlled manner, the depth of grooving is varied so that the desired corrugated pattern is produced on the roller 526. Sources for such rollers include Custom Etch Rolls Inc., 1813 West State Street, New Castle, Pa. 16101. In the illustrative embodiment, the press roller 526 is formed from a metallic material such as, for example, a chromium-free steel. After placement of the desired pattern, it is chrome plated to prevent rusting. The press roller 528 has a resilient, somewhat flexible outer surface 540, such as one formed from a vulcanized elastomeric material. An illustrative vulcanized elastomeric material is 75 durometer urethane. In the illustrative embodiment, the outer surface 540 of the press roller 528 is substantially smooth.

When the heated veneer 520 is pressed between the rollers 526, 528, the desired corrugated pattern is impressed into the veneer 520. The chemically-etched outer surface 530 of the press roller 526 engraves the veneer 520. The corrugated sheet 536 is then dried, for example, in a veneer drying oven 34, without relieving the corrugations. Then, the dried corrugated sheet 536 is surfaced, for example, sanded using a sander 36, to a veneer thickness 38 in the range of about 0.25 to about 0.75 mm. Through this surfacing process, crests 538 of the corrugations of the corrugated sheet 536 are removed, cutting through the grain. The overall appearance of the thus-processed figured veneer 50 changes. The reflection of light change between adjacent interleaved areas 52, 54 in the figured veneer 50 creates the figured effect illustrated in FIG. 5.

The inventive process does not compress the fibers of the veneer 20, 120, 220, 320, 420, 520 during surfacing. As a result, the starting thickness 22, 122, 222, 322, 422, 522 of the veneer 20, 120, 220, 320, 420, 520 does not need to be as great (about 2 mm or more) as required by the prior art to generate the wavy or figured pattern. There is thus less waste produced by the inventive process. Veneer produced by the inventive process is believed to be much smoother and have a higher surface quality than figured veneer produced by prior art processes. Additionally, the described processes can be performed on either green (wet) or dry veneer with good results.

What is claimed is:

1. A method for making a piece of figured wood veneer, the method comprising softening lignin in a sheet of wood veneer, advancing the sheet of wood veneer between (i) a first roller having a metallic body and a semi-flexible elastomeric outer surface and (ii) a second roller having a corrugated outer surface to form a sheet of corrugated wood veneer having a plurality of crests, and surfacing the sheet of corrugated wood veneer to remove the plurality of crests to make the piece of figured wood veneer.

2. The method of claim 1 wherein the semi-flexible elastomeric outer surface of the first roller is corrugated.

3. The method of claim 2 wherein advancing the sheet of wood veneer between the first roller having the semi-flexible outer surface and the second roller having the corrugated outer surface comprising engaging a first plurality of teeth of the first roller and a second plurality of teeth of the second roller with the sheet of wood veneer.

4. The method of claim 1 wherein the semi-flexible outer surface of the first roller is formed from a vulcanized elastomeric material.

5. The method of claim 1 wherein softening the lignin in the sheet of wood veneer comprises heating the sheet of wood veneer.

6. The method of claim 5 wherein heating the sheet of wood veneer comprises steaming the sheet of wood veneer in a steamer.

7. The method of claim 1 further comprising drying the sheet of corrugated wood veneer without relieving the corrugations.

8. The method of claim 7 wherein drying the sheet of corrugated wood veneer comprises passing the sheet of corrugated wood veneer through a veneer drying oven.

9. The method of claim 1 wherein surfacing the sheet of corrugated wood veneer comprises sanding the sheet of corrugated wood veneer.

10. A method for making a piece of figured wood veneer, the method comprising softening lignin in a sheet of wood veneer, advancing the sheet of wood veneer between a first roller having a semi-flexible outer surface and a second roller having a corrugated outer surface to form a sheet of corrugated wood veneer having a plurality of crests, the corrugated outer surface of the second roller being non-complementary with the semi-flexible outer surface of the first roller, and surfacing the sheet of corrugated wood veneer to remove the plurality of crests to make the piece of figured wood veneer.

11. A method for making a piece of figured wood veneer, the method comprising softening lignin in a sheet of wood veneer, advancing the sheet of wood veneer between (i) a first roller having a metallic body and a corrugated semi-flexible elastomeric outer surface and (ii) a second roller having a corrugated outer surface to form a sheet of corrugated wood veneer having a plurality of crests, and surfacing the sheet of corrugated wood veneer to remove the plurality of crests to make the piece of figured wood veneer.

* * * * *